United States Patent [19]
Rose

[11] Patent Number: 5,541,983
[45] Date of Patent: Jul. 30, 1996

[54] AUTOMATIC TELEPHONE FEATURE SELECTOR

[75] Inventor: Kevin T. Rose, Ottawa, Canada

[73] Assignee: Mitel Corporation, Kanata, Canada

[21] Appl. No.: 352,747

[22] Filed: Dec. 2, 1994

[30]   Foreign Application Priority Data

Dec. 3, 1993 [CA]  Canada .................................. 2110669

[51] Int. Cl.⁶ ........................... H04M 3/42; H04M 11/00; H04M 3/00
[52] U.S. Cl. ........................... 379/201; 379/94; 379/211; 379/243
[58] Field of Search ................................... 379/90, 91, 93, 379/94, 95, 188, 196, 197, 198, 201, 242, 258, 357, 243, 211

[56]   References Cited

U.S. PATENT DOCUMENTS 4,759,056   7/1988   Akiyama .................................. 379/197
4,899,373   2/1990   Lee et al. .............................. 379/201 X

*Primary Examiner*—Jeffery Hofsass
*Assistant Examiner*—Harry S. Hong
*Attorney, Agent, or Firm*—Marks & Clerk

[57]   ABSTRACT

In a telephone system serving premises having a plurality of terminals offering subscriber selectable features, an arrangement is described for changing the active features of the terminals according to whether the associated subscribers are on or off the premises. The arrangement comprises a device for generating signals identifying the subscribers and indicating an "in" or "out" status therefor, a memory for storing data indicating the features required by the respective subscribers in their "in" and "out" status, and a device responsive to the signals and the data stored in the memory to select the appropriate features in the telephone system as the subscribers enter and leave the premises.

8 Claims, 4 Drawing Sheets

Table A

| Bar Code # | Phone # |
|---|---|
| 100-968-7034569 | 1511 |
| 100-968-7034570 | 1522 |
| 100-968-7034571 | 1523 |
| 100-968-7034572 | 1524 |
| ............ | ...... |

Table B

| Phone # | Name | in/out | ...... |
|---|---|---|---|
| 1511 | T. Rose | in | ...... |
| 1522 | S. Boyle | out | ...... |
| 1523 | S. O'Reilly | out | ...... |
| 1524 | B. Fawlty | in | ...... |
| ...... | | | ...... |

FIG. 2

Table B

| Phone # | Name | in/out | COS - in | COS - out | Toll Resr - in | Toll Resr - out |
|---------|------|--------|----------|-----------|----------------|-----------------|
| 1511 | T. Rose | in | 1 | 2 | 1 | 2 |
| 1522 | S. Boyle | out | 1 | 2 | 1 | 2 |
| 1523 | S. O'Reilly | out | 3 | 3 | 2 | 3 |
| 1524 | B. Fawlty | in | 4 | 5 | 1 | 3 |
| ...... | ...... | ...... | ...... | ...... | | |

Table D

| feature | COS # | | | | | |
|---------|---|---|---|---|---|---|
| | 1 | 2 | 3 | 4 | 5 | ...... |
| call forward - busy | on | off | ...... | | | |
| call forward - no answer | on | off | ...... | | | |
| call forward - always | off | on | ...... | | | |
| speed call - display | on | off | ...... | | | |
| speed call | on | off | ...... | | | |
| call back | on | off | ...... | | | |
| ...... | ...... | ...... | ...... | | | |

Table E - 1

| Toll Restriction - 1 |
|----------------------|
| no restriction - 1   |
| (unrestricted)       |

Table E - 2

| Toll Restriction - 2 |
|----------------------|
| 1-900* |
| 1-416* |
| (all long distance #'s with 416 area code & all 1-900 numbers are blocked) |

Table E - 3

| Toll Restriction - 3 |
|----------------------|
| 1* |
| (all long distance numbers blocked) |

FIG. 3

Call Process - T. Rose last number redialled - 1234

......

call fwd - always - IN: n/a
call fwd - always - OUT: 225-0716
call fwd - no answ - IN: 9987
call fwd - no answ - OUT: n/a
call fwd - busy - IN: 9987

......

call fwd active - YES

......

Call Process - S. Boyle last number redialled - 1357

......

call fwd - always - IN: n/a
call fwd - always - OUT: 2790
call fwd - no answ - IN: 3498
call fwd - no answ - OUT: 225-0823
call fwd - busy - IN: 9543

......

call fwd active - YES

AUTOMATIC TELEPHONE FEATURE SELECTOR

BACKGROUND OF THE INVENTION

This invention relates to a telephone system serving premises having a plurality of terminals, such as telephone terminals, offering subscriber selectable features.

A modern private automatic branch exchange (PABX) offers subscribers a choice of many features such as Forward No Answer, Call Forward Busy, Call Forward Always, or Toll Restriction. The features required by each subscriber obviously depend on whether the subscriber is "in" or "out" For example, when a subscriber is "in", he or she may wish to activate the Call Forward No Answer Feature, which forwards the call to a predetermined number, such as a secretary, after a predetermined number of rings, whereas when the subscriber is "out" he or she may wish to forward the call immediately to another number, for example a secretary, a home number or a voice mail box. When the subscriber is out, there is clearly no need for the caller to wait three (or more) rings before the call is forwarded.

Another feature often required by subscribers when they are "out" is Toll Restriction. A subscriber may need to make long distance telephone calls, but to prevent abuse ensure that long distance calls are blocked when that subscriber is not on the premises.

Presently, in order to change the active features the subscriber must remember to reprogram the telephone each time he or she leaves or enters the premises. Often the subscriber will forget to do this, and it can be a major inconvenience if the subscriber is in a rush.

An alternative known method is for the PABX to have a Night Service condition. At a certain time, for example 5:00 p.m. when the receptionist goes home, the PABX is switched over to the night condition and all telephones are put into the night service mode, which may involve different features from those in the day mode. A disadvantage of this system is that many subscribers do not keep regular office hours, and consequently the desired features may not be appropriate at all times. For example, if a subscriber is out during the day a toll restriction feature would not be activated, leaving open the possibility of abuse by say a junior employee.

An object of the present invention is to alleviate the aforementioned disadvantages of the prior art.

SUMMARY OF THE INVENTION

According to the present invention there is provided in a telephone system serving premises having a plurality of terminals offering subscriber selectable features, an arrangement for changing the active features of the terminals according to whether the associated subscribers are on or off the premises, comprising means for logging said subscribers as they enter and leave the premises, said means generating signals identifying the subscribers and indicating an "in" or "out" status therefor, a memory for storing data indicating the features required by the respective subscribers in their "in" and "out" status, and means responsive to said signals and said data stored in said memory to select the appropriate features in said telephone system as the subscribers enter and leave the premises.

Preferably the logging means comprises portable personal identification devices to be carried by the subscribers and a reader for reading said devices as the subscribers enter and leave the premises.

A portable identification device may be, for example, a card or identity badge with a bar code or magnetic strip identifying the user. Many facilities already require employees to pass such devices through a reader as they enter and leave the premises, and in this case signals generated for the central employee recording system can be used to change the selected telephone features for the subscriber in question. If desired, the arrangement can be set up so that a certain employee, for example a secretary, leaves the premises her telephone is set up to change the features for all the people she serves. For example, any calls routed to her telephone could be directly routed to the appropriate ultimate subscriber. In other words, the arrangement does not have to work on a one-on-one basis.

Alternatively, the invention finds application in a customer service environment. For example, using a touchtone service a customer may be able to select one of three operators according to the desired service. When one of the operators logs out, the arrangement can be set to direct her calls automatically to an automated attendant or other facility.

Conveniently the signals generated by the card reader are passed through a local area network to a processor connected to the memory storing the features required by the subscribers in their in and out status. The memory can be, for example, a read/write programmable memory, a disk, or RAM.

In accordance with the invention, assuming the facility already uses an employee badge check-in/check-out system, no additional hardware is required at the entry/exit point. Use is made of the existing signals generated to change the telephone features.

The invention is not uniquely applicable to a PABX. For example, it can be applied to a key system, a wireless system, or a central office service such as Centrex, or a LAN-based system, such as a telephone system running on a distributed LAN of PCs.

According to a further aspect, the invention provides a method of changing the active features of terminals on premises served by a telephone system offering subscriber selectable features according to whether the associated subscribers are on or off the premises, comprising: storing data indicating the features required by the subscribers when they are on and off the premises; generating signals indicating the entry to and departure from the premises of the subscribers; and changing the selected features for the respective subscribers in accordance with said signals and said stored data.

BRIEF DESCRIPTION OF THE DRAWINGS

The invention will now be described in more detail, by way of example only, with reference to the accompanying drawings, in which:

FIG. 2 shows in more detail the tables stored in the memory;

FIG. 3 illustrates the look-up tables incorporated in the PABX of an alternative embodiment of the invention; and FIG. 4 is a block diagram of stored call process information.

DESCRIPTION OF THE PREFERRED EMBODIMENTS

Figure 1:
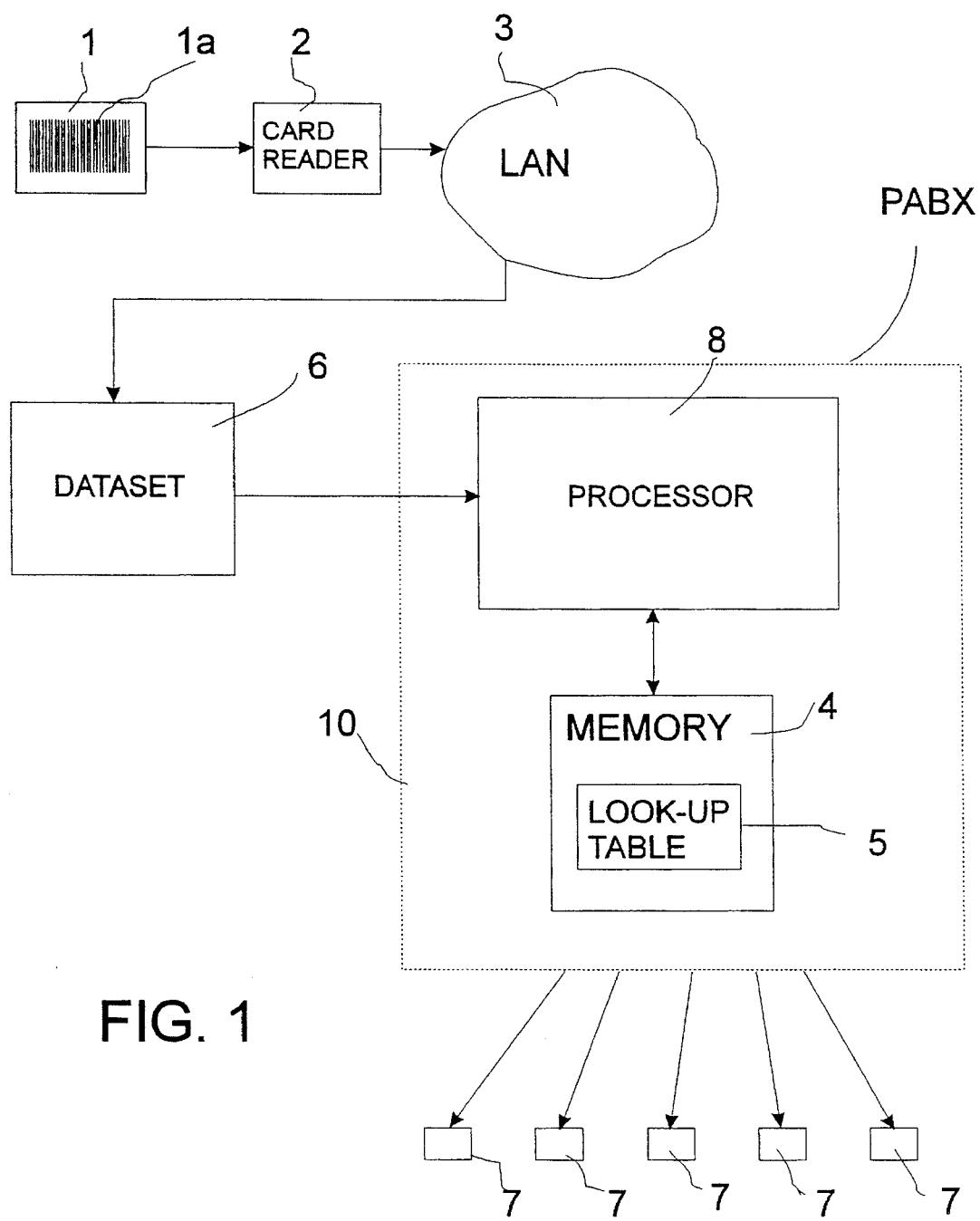
FIG. 1 is a block diagram of a telephone system in accordance with the invention.

Referring now to FIG. 1, the telephone system comprises a card 1 carrying a bar code 1a normally carried by an employee. Each time the employee enters or leaves the premises, he or she passes the card through card reader 2.

The card reader 2 is connected through a LAN 3, which acts as a transport vehicle, and a dataset 8, which is a hardware device that interprets the incoming signals from the LAN, to a processing unit 6 forming part of PABX 10, which records the arrivals and departures of employees in the memory 4 to which the processing unit is connected. The memory 4 also contains look-up table 5. The PABX 6 is connected to subscriber telephone sets or terminals 7.

In operation, the card reader generates two signals, one identifying the employee and the other indicating whether the signal corresponds to a "badge in" or "badge out" condition. These signals are then interpreted by processor 6, which determines from look-up table 5 in memory 4 which feature(s) should be activated for the relevant subscriber set 7. These features depend on the identification of the employee and of course whether the signals represent a "badge in" or "badge out" condition.

More particularly, the processor 6, or dataset device driver, interprets the data received over the LAN 3 from card reader 2 and reads the look-up table 5 to obtain the subscriber's phone number. Look-up table 5 consists of two tables, A and B as shown in FIG. 2.

As can be seen in FIG. 2, look-up table A identifies the telephone number according to the bar code number on the card 1 (FIG. 1). The processor 6 then updates table B to identify the subscriber in/out status as appropriate.

The central engine of a telephone system handles call processing. This engine is responsible for the handling of all calls and the execution of features. Call processing engine also stores dynamic information that exists on a per subscriber basis, such as last number redialled, and any numbers to Call Forward to, and whether the Call Forwarding is currently active.

FIG. 3 illustrates a database stored in memory within the PABX, which identifies the features or services programmed for each subscriber, who is allocated a COS (class of service) number in accordance with his chosen features. A simple way of implementing the present invention is to assign to each subscriber, unlike the prior art where a subscriber only has one COS number relating to the active status of his or her telephone, two COS numbers, one for when the subscriber is in the office and a different one for when the subscriber is out. By simply selecting the in or out COS number, the system can conveniently switch from the in and out classes of service.

For example, referring to Table B, it will be seen that employee T. Rose who has the extension number 1511, presently has an "in" status, and has a COS number of 1 when in and a COS number of 2 when out.

Referring to Table D, which is also stored in memory in the PABX 6, COS number 1 indicates Call Forward when busy, Call Forward when no answer, etc.

Table B also includes toll restrictions that are more particularly identified in Tables E-1 to E-3.

An example of the embodiment shown in FIGS. 3 and 4 will now be described in more detail with reference to FIGS. 3 and 4.

EXAMPLE 1

There is a call for T. Rose who is not at this desk. Table B indicates that he is currently in the office and that his COS number is 1. COS 1 has call forward no answer programmed and the Call Process indicates that call forwarding is activated. Therefore, after three rings the call is forwarded to another number. The number forwarded to has been stored by his Call Process, 9987.

EXAMPLE 2

A call comes in for S. Boyle. Table B indicates that he is out of the office and that his COS number is 2. Since COS 2 indicates that call forward always is available and the Call Process indicates the call forward has been activated. Therefore, this call is immediately redirected to a number that he also previously programmed, 2790. (in this example that number is his voice mail box)

EXAMPLE 3

S. O'Reilly wants the same set of features programmed on his phone whether he is in or out of the office. To do this, he has COS 3 programmed both for when is in and out of the office.

EXAMPLE 4

S. Boyle does not want anyone to use or to see any of the speed calls he has programmed, because they are of a personal nature. For this reason, while he is out of the office COS 2 is active, in which the speed call feature is off, and the speed call display feature, used for viewing speed calls, is also off.

The Toll Restriction tables prevent certain types of calls from being made. This feature is useful for cutting the costs for businesses. In the above tables, Table E-1 places no restrictions on outgoing calls, E-2 places some restrictions, and E-3 restrict all long distance calls. The Toll Restriction could also prevent any outgoing calls, if desired.

Toll Restrictions is implemented in software as follows: while dialing is taking place the Call processing compares the digits that were just dialed with those in the user's current Toll Restriction table. If a match is found the call is blocked, otherwise the call proceeds.

Similarly to the Class of Service, the employee may have different toll restrictions applied to his extension, depending upon whether he is in or out of the office, as shown in Table B. Let us look at an example:

EXAMPLE 5

When B. Fawlty leaves the office he wants to prevent any long distance calls from being made from his number. However, while at work, he needs to be able to make long distance calls. From Table B, we can see that his Toll Restriction table is E-1 while he is in the office, placing no restrictions on his calls. While he is out of the office, Table E-3 takes effect, and all long distance calls are blocked.

It will be understood from the above description how the inventive system allows the active features of each subscriber's telephone to be changed when the subscriber enters or leaves the premises. Although this system has been described with reference to a card reader device, other means of changing the status of the system can be employed. For example, the system could be switched over when the subscriber logs on or off his computer.

I claim:

1. In a telephone system serving premises having a plurality of terminals each offering subscriber selectable features, and each terminal being associated with a particular subscriber, an arrangement for changing the active features of the terminals according to whether the respective associated subscribers are on or off the premises, comprising input means remote from said terminals and responsive to input from any of said subscribers to generate signals identifying the inputting subscriber and indicating an "in" or "out" status therefor, a central memory for storing a first set of data indicating the features pre-selected by the respective subscribers for their associated terminals in the "in" status and a second set of data indicating the features pre-selected by the respective subscribers for their associated terminals in the "out" status, and processor means responsive to said signals and said first and second data stored in said memory to activate the appropriate features corresponding to the "in" or "out" status in the terminal associated with the inputting subscriber as that subscriber enters and leaves the premises, said input means being connected to said processor means over a communications link.

2. A telephone system as claimed in claim 1, wherein said input means comprise portable personal identification devices to be carried by the subscribers, and a reader for reading said devices as the subscribers enter and leave the premises.

3. A telephone system as claimed in claim 2, wherein said portable personnel identification devices comprise cards with identification data stored thereon.

4. A telephone system as claimed in claim 3, wherein said identification data stored is stored in a magnetic strip.

5. A telephone system as claimed in claim 3, wherein said identification data stored is stored in a bar code.

6. A telephone system as claimed in claim 2, wherein said communications link comprises a local area network.

7. A telephone system as claimed in claim 1, wherein said memory incorporates a look-up table containing the terminal number and preferences for the "in" and "out" status for each subscriber.

8. A telephone system as claimed in claim 1, wherein said memory is included in said telephone system.

* * * * *